Feb. 23, 1926.
C. C. NEAL
PRESSURE GAUGE CAP
Filed Oct. 21, 1922
1,574,204
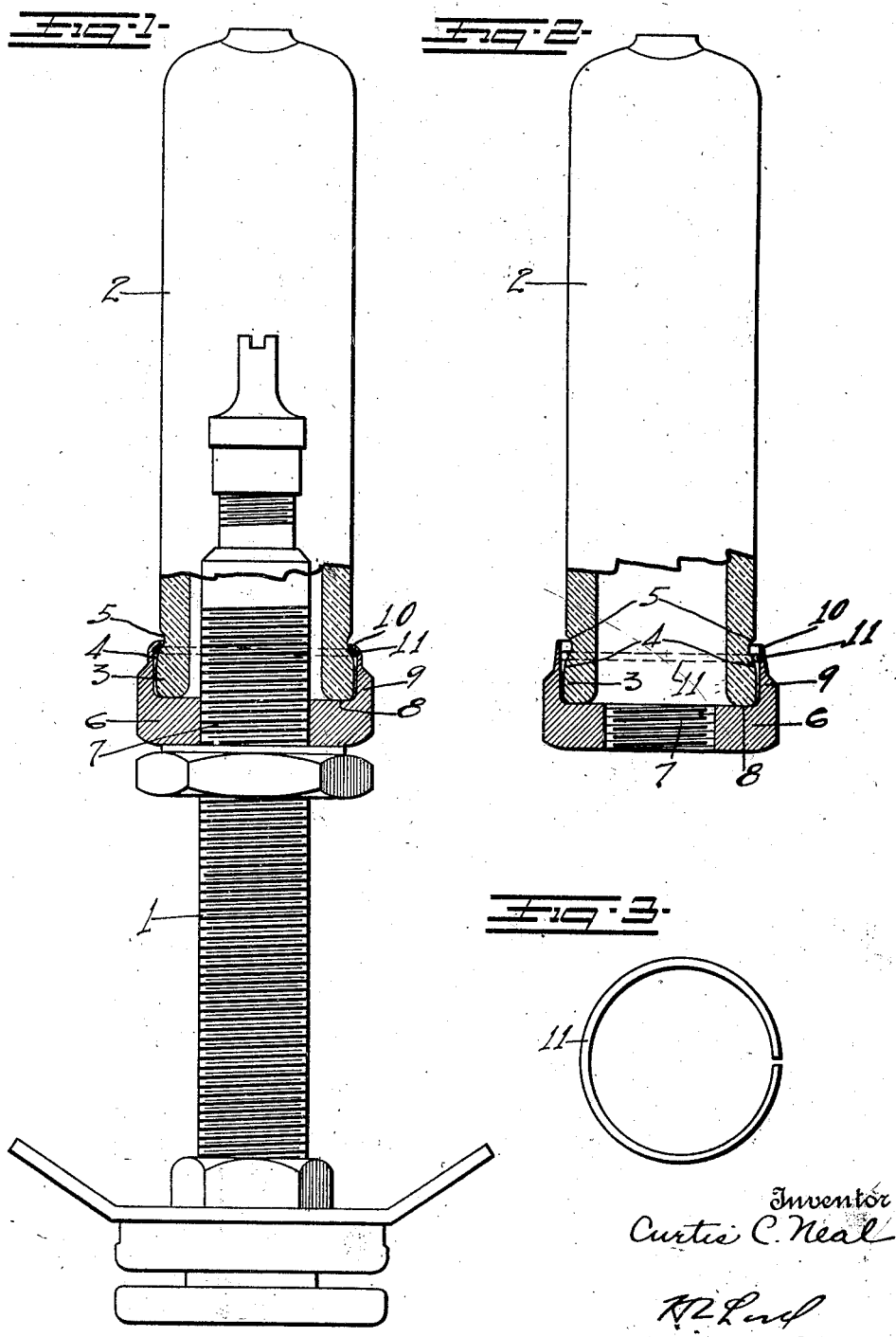
Inventor
Curtis C. Neal
Attorney Patented Feb. 23, 1926.

1,574,204

UNITED STATES PATENT OFFICE.

CURTIS C. NEAL, OF MARMET, WEST VIRGINIA, ASSIGNOR, BY MESNE ASSIGNMENTS, TO TIREGAGE VALVE CORPORATION, OF CHARLESTON, WEST VIRGINIA, A CORPORATION OF WEST VIRGINIA.

PRESSURE-GAUGE CAP.

Application filed October 21, 1922. Serial No. 595,978.

*To all whom it may concern:*

Be it known that I, CURTIS C. NEAL, a citizen of the United States, residing at Marmet, in the county of Kanawha and State of West Virginia, have invented new and useful Improvements in Pressure-Gauge Caps, of which the following is a specification.

In forming transparent pressure gauge caps is is difficult to so secure the cap which is ordinarily formed of glass to a base which can be screwed on to the tire pressure gauge stem. The present invention is designed to form a practically sealed joint between the base and glass cap which will at the same time relieve the cap of breaking strains.

The invention is illustrated in the accompanying drawings as follows:—

Fig. 1 shows a side elevation of a gauge stem with a glass cap in place thereon.

Fig. 2 a side elevation, partly in section, of a glass cap in the process of construction.

Fig. 3 a plan view of a sealing ring.

1 marks the pressure gauge stem, 2 a glass cap.

The glass cap has an enlarged exterior shoulder 3 at its lower end, this shoulder having a slanting or tapered upper surface 4 terminating preferably in a slight groove 5.

A base 6 has a screw-threaded opening 7 by which it may be screwed on to the stem and has a socket 8 in which the glass cap is placed, the wall 9 of the socket terminating with a thin crimping edge 10 at its upper edge directly opposite the groove 5. A sealing wire 11, preferably of soft metal, such as soft copper, is placed on the shoulder 4 and the edge 10 is crimped over the wire. The wire is crowded on to the slanting surface effectively sealing the joint. At the same time the wire makes it possible to have the crimping edge slightly spaced from the glass so that it can be effectively crimped without straining the glass. The wire as shown in Fig. 3 is preferably in the form of a ring slit at one portion so that it may be readily assembled.

What I claim as new is:—

A transparent cap for pneumatic pressure gauge stems comprising a metal base having a screw-threaded opening and a cap receiving socket; a glass cap having a shoulder at its open end; a soft closure wire on the shoulder; and an inturned edge of the wall of the socket engaging the wire and seating the same on the shoulder the outer wall having a diameter preventing the out-springing of the wire and the inturned edge preventing the up-springing of the wire away from the shoulder making a permanent connection between the base and the glass cap.

In testimony whereof I have hereunto set my hand.

CURTIS C. NEAL.